US008108540B2

(12) United States Patent
Allen et al.

(10) Patent No.: US 8,108,540 B2
(45) Date of Patent: Jan. 31, 2012

(54) ENVELOPE ATTACHMENT FOR MESSAGE CONTEXT

(75) Inventors: Nicholas A. Allen, Redmond, WA (US); Justin David Brown, Seattle, WA (US); Stephen Jared Maine, Redmond, WA (US); Stephen J. Millet, Edmonds, WA (US); Edmund Samuel Victor Pinto, Duvall, WA (US); Tirunelveli R. Vishwanath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 12/334,300

(22) Filed: Dec. 12, 2008

(65) Prior Publication Data

US 2010/0153570 A1    Jun. 17, 2010

(51) Int. Cl.
*G06F 15/16*    (2006.01)
*G06F 17/30*    (2006.01)

(52) U.S. Cl. ......... 709/231; 709/232; 707/802; 707/811

(58) Field of Classification Search .......... 709/230–232; 707/802, 811
See application file for complete search history.

(56) References Cited

U.S. PATENT DOCUMENTS

| | | | |
|---|---|---|---|
| 2003/0236912 A1 | 12/2003 | Klemets et al. | |
| 2004/0163037 A1* | 8/2004 | Friedman et al. | .......... 715/501.1 |
| 2004/0205216 A1 | 10/2004 | Ballinger et al. | |
| 2005/0068913 A1 | 3/2005 | Tan et al. | |
| 2005/0144137 A1 | 6/2005 | Kumar et al. | |
| 2006/0036754 A1 | 2/2006 | Itoh et al. | |
| 2006/0056413 A1 | 3/2006 | Ikeda et al. | |
| 2006/0123047 A1 | 6/2006 | Christensen et al. | |
| 2006/0167828 A1 | 7/2006 | Di Luoffo et al. | |
| 2006/0282542 A1* | 12/2006 | Pinckney et al. | ............. 709/231 |
| 2008/0168150 A1 | 7/2008 | Chen et al. | |

FOREIGN PATENT DOCUMENTS

WO    WO0049773    8/2000

OTHER PUBLICATIONS

Ying Ying, Yan Huang and David W. Walker, A Performance Evaluation of Using SOAP with Attachments for e-Science, http://www.allhands.org.uk/2005/proceedings/papers/422.pdf, 2005, 8 Pages.
Henrik Frystyk Nielsen and Herve Ruellan, SOAP 1.2 Attachment Feature, http://www.w3.org/Tr/soap12-af/, Jun. 2004, 14 Pages.

* cited by examiner

*Primary Examiner* — Patrice Winder
*Assistant Examiner* — Ebrahim Golabbakhsh
(74) *Attorney, Agent, or Firm* — Workman Nydegger

(57) ABSTRACT

A system for aggregating context information for messages. The system includes a context container. The context container associates names with context values and metadata for context entries. The system further includes a network protocol component configured to read messages from a network transport, an encoder component configured translate messages from a raw format into a canonical message format. The canonical message format is an enveloped message containing an application payload and message metadata. The context container is associated with a message in the canonical format. The system further includes an extraction component configured to retrieve context from a native network transport protocol and insert the context values and metadata into the context container, a plurality of additional protocol components configured to add, remove, or modify entries in the context container, and one or more higher level application components configured to operate on the canonical message using the context entries.

18 Claims, 4 Drawing Sheets

ENVELOPE ATTACHMENT FOR MESSAGE CONTEXT

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Network messages typically have some context associated with them. For example, there may be information about a transport protocol (e.g. HTTP) on which the message was received, information about origin and destination addresses for the message, security information about the message (e.g. encoding used to encrypt a message), information about a transaction to which the message belongs, information about application state, etc. associated with the message.

Enveloped messages encapsulate an application-structured payload with message metadata, such as headers, addressing information, and transient message properties. Message envelopes permit attaching header and delivery information in a transport-independent fashion, without requiring that the sender, receiver, or intermediaries understand the unique formats and specifications of the underlying protocols. Distributed applications commonly use enveloped messages. For example, web services typically use messages enveloped with the Simple Object Access Protocol (SOAP) envelope format, to canonicalize and abstract the process of message transmission. These abstractions may not be directly available in TCP/IP, HTTP, and other pervasively used networking protocols; or, various and disparate implementations of the abstraction may exist depending on the protocol chosen.

Context is an example of message metadata that today is exchanged in a variety of ways, other than in envelopes. One example of context is an on-line shopping cart which may have one or more items in the shopping cart. A "purchase" message sent by a user is evaluated in the context of what is in the shopping cart. Often, access to the shopping cart contents is controlled by a cookie on a user's computer. HTTP applications alone have a variety of context mechanisms, including the Set-Cookie header; Set-Cookie2; address-encoded context in query strings, hash fragments, or path components; authentication headers; hidden form fields; DOM properties; and local client stores. Each of these mechanisms defines its own representation for context values, metadata, and access mechanisms. Moreover, context may be exchanged in proprietary formats or private application protocols, whose existence is not known to others. This diversity results in applications being crafted for a particular context mechanism. Consequently, the design choices of the application are coupled with the function of the message processing pipeline, as well as later components in the pipeline being dependent on earlier components.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method that may be practiced in a computing environment. The method includes acts for aggregating context information for messages. The method includes receiving a message from a computer implemented communication medium. The message is processed to form a canonical enveloped message. The canonical enveloped message includes payload data and a context store. At a protocol pipeline, where the protocol pipeline includes a number of protocol components, the canonical enveloped message is processed using two or more of the protocol components to process the canonical enveloped message. Processing the canonical enveloped message using a protocol component includes for each protocol component used at least one of, adding, removing or modifying context entries in the context store. Each context entry in the context store includes at least a name element, a value element, and optionally a metadata element, such that context information for a plurality of protocol components is aggregated using a common format in the context store. The canonical enveloped message is processed at an application, including processing based on context entries in the context store, including context entries added or modified by the protocol components.

A complementary embodiment includes another method that may be practiced in a computing environment. The method includes acts for aggregating context information for messages. The method includes receiving a canonical enveloped message from a computer implemented application. The canonical enveloped message includes payload data and is associated with a context store. At a protocol pipeline including a plurality of protocol components, the canonical enveloped message is processed using two or more of the protocol components to process the canonical enveloped message. Processing the canonical enveloped message using a protocol component includes for each protocol component used at least one of, adding, removing or modifying context entries in the context store. Each context entry in the context store includes at least a name element, a value element, and optionally a metadata element. At least a portion of the canonical enveloped message is sent on a computer implemented communication medium.

Another embodiment includes a system for aggregating context information for messages. The system includes a context container. The context container associates names with context values and metadata for context entries. The system further includes a network protocol component configured to read messages from a network transport. The system further includes an encoder component configured to translate messages from a raw format into a canonical message format. The canonical message format is an enveloped message containing an application payload and message metadata. The context container is associated with a message in the canonical format. The system further includes an extraction component configured to retrieve context from a native network transport protocol and insert the context values and metadata into the context container. The system further includes a plurality of additional protocol components configured to add, remove, or modify entries in the context container. The system further includes one or more higher level application components configured to operate on the canonical message using the context entries.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
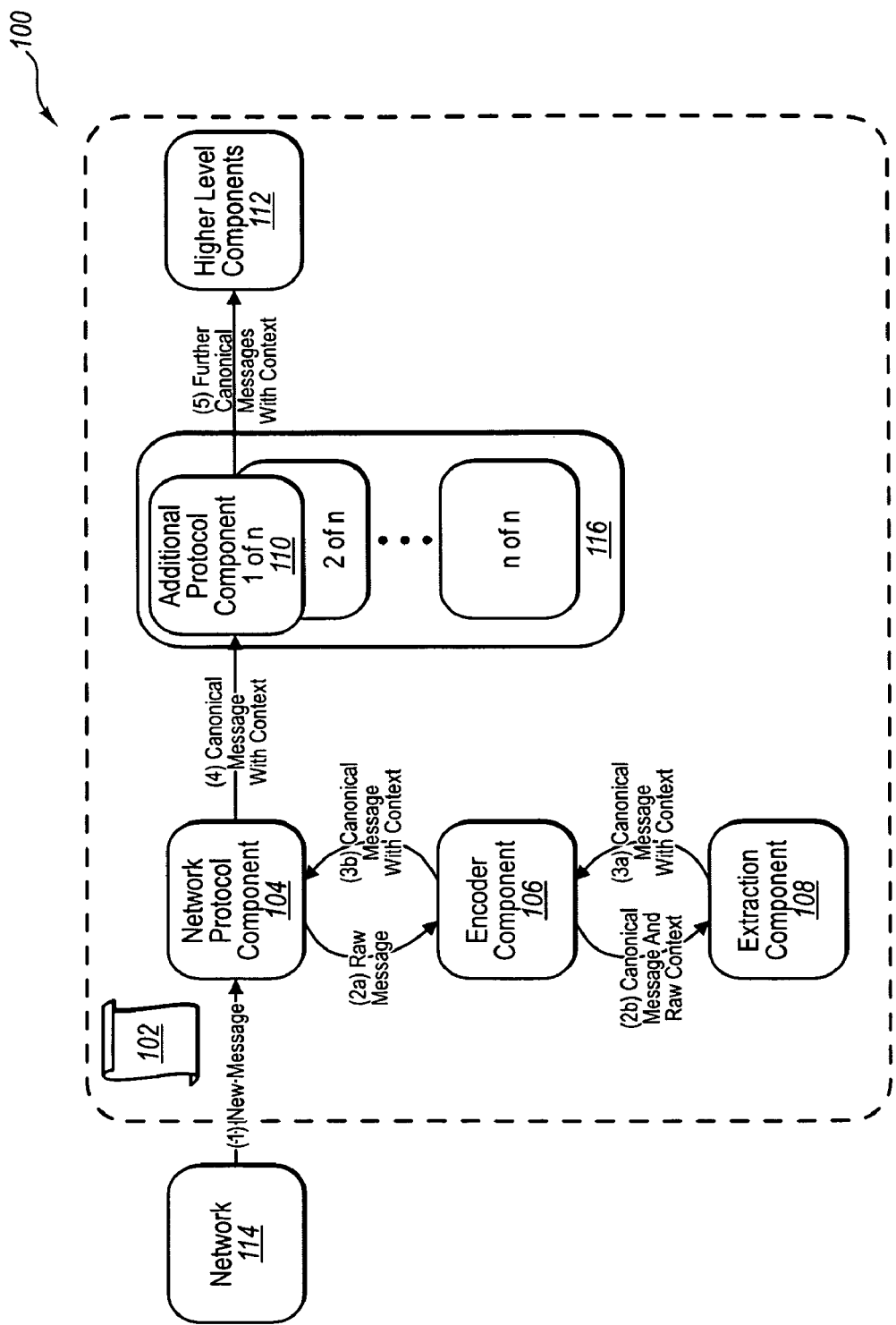
FIG. 1 illustrates system components and operations for receiving messages.

Some embodiments described herein implement a scheme to represent context in a canonical fashion so that applications and pipeline components can be written without regard to the specific details of a context mechanism. This context representation can aggregate values from multiple context mechanisms being used together and is independent of both the underlying context formats and organization of values. The context, which includes both values and value metadata, attaches to the message envelope as a local delivery property. However, there is no presupposition that a message envelope is known by the other party or exists during transmission. Messages are rewritten as they are sent or received to construct the envelope if necessary and the context is translated to and from the underlying protocols. This rewriting is done such that neither the application nor the message processing pipeline requires knowledge or special handling of the rewritten messages. The scheme may be executed multiple times as protocols act on the message in the pipeline.

Embodiments may include various features such as implementing different protocol mechanisms for representing context that can share a common representation. The common representation can include both context values and metadata about each value. The common representation can be associated with an enveloped message by attaching the context to the message envelope. Non-enveloped messages can be transparently rewritten to map context between the enveloped and non-enveloped representations.

Additionally, multiple context mechanisms can be used at once, with their values aggregated together. The aggregated values can be organized either algorithmically or via a developer-defined mapping. The aggregated values can be organized independently of the groupings defined by the individual context mechanisms. Context mechanisms may be applied at different times as the message is processed, with the associated context transformed or augmented by each protocol.

Consider now an illustrative example of an application reading messages from a communication medium, each message possibly incorporating contextual information about the conversation or sequence of messages to which the particular message belongs. The contextual information may be encoded using one or more protocols, and those protocols may be a part of the transport protocol defined by the communication medium or be a part of some higher-level application protocol.

Initially the received message might not be described using an enveloped message format. Because using a bifurcated message processing pipeline to handle multiple formats can add complexity and cost to the application, the received message is rewritten to always use an enveloped format. Some embodiments include in the rewriting process actions to extract context values and metadata encoded by the original format and provide this context as a transient message property associated with the enveloped message.

Additionally, protocols in the message processing pipeline may act on the enveloped message. A pipeline component may create a context (if earlier pipeline components did not) and adds, removes, or modifies context entries according to the protocol for the pipeline component. In one embodiment, the added context values and metadata are grouped according to the pipeline stage at which they are extracted from the message. In other embodiments, the added context values are organized according to either an algorithm defined by the pipeline component or a specification defined by the application developer.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Referring now to FIG. 1, various computer implemented modules are illustrates. FIG. 1 illustrates an application 100. The application contains a number of computer implemented modules as follows.

The application 100 includes a context container 102. The context container 102 associates names with context values and metadata. In one embodiment, the context names and values are defined as strings. In other embodiments, the names and values may be hierarchically structured. Examples of context metadata include additional information about the context value, such as when the context was created or expires, who created or can modify the context, a semantic description of the context, or restrictions on applying the context. Examples of restrictions on applying the context may include, for example, restricting the context values to be used with particular addresses, security modes, or message types.

The application 100 further includes a network transport protocol 104. The network transport protocol 104 reads messages from a network transport. One example of a network transport includes an HTTP connection between two systems.

The application 100 further includes an encoder component 106 that translates messages from a raw format into a canonical message format. The canonical message format is an enveloped message (for example, a SOAP message) containing an application payload and message metadata, such as headers, addressing information, and transient message properties. The context container is associated with a message in the canonical format, such as by using a transient message property that attaches to the message envelope.

The application 100 further includes an extraction component 108 that retrieves context from the native network transport protocol and inserts the context values and metadata into a context container. The extraction component 108 might incorporate into the encoder component as a part of the rewriting process.

The application 100 further includes one or more additional protocol components 110 that add, remove, or modify entries in the context container. A protocol component might create a new context container if one does not already exist.

The application 100 further includes one or more higher level application components 112. The higher level application components 112 represent effectively, the rest of the system.

Figure 2:
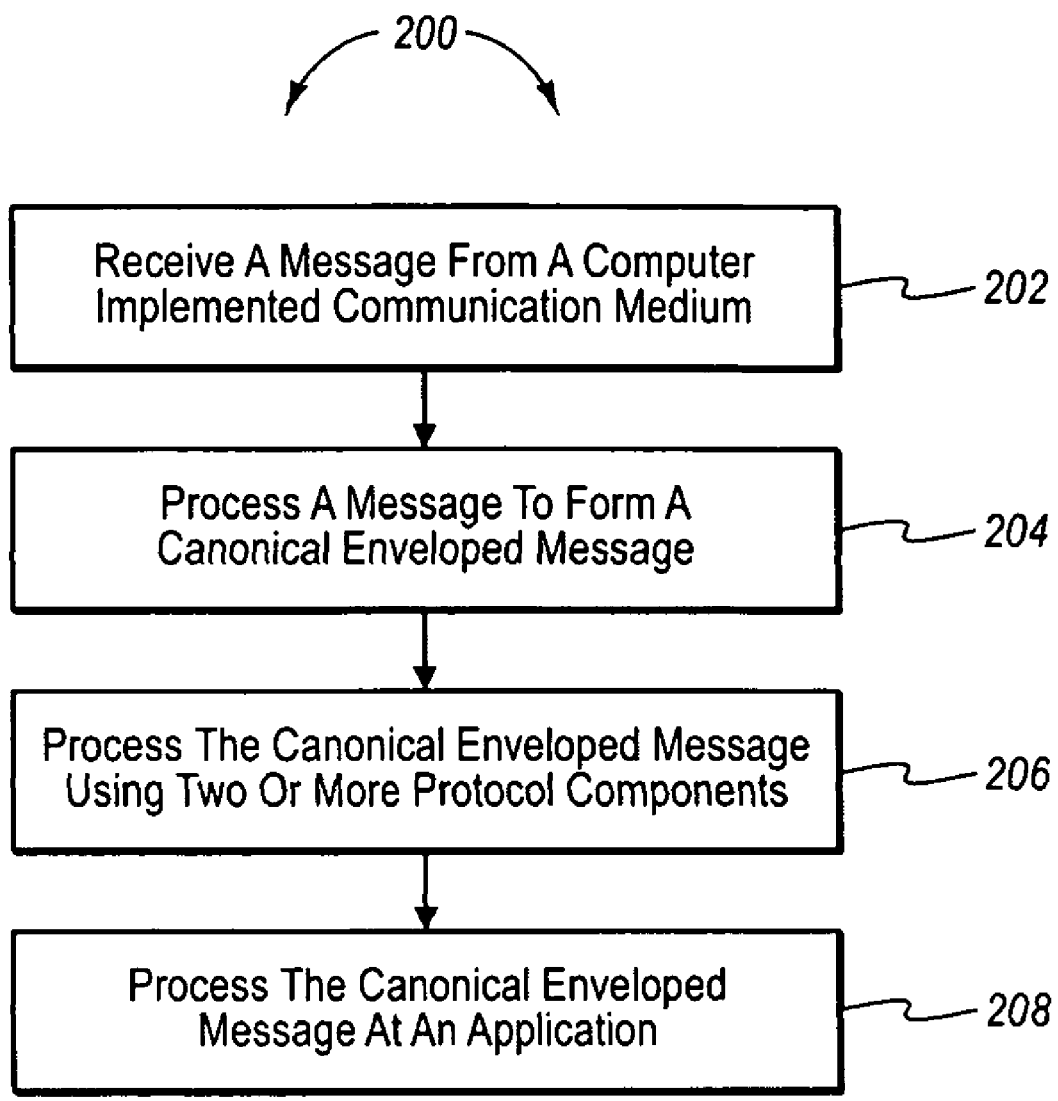
FIG. 2 illustrates a method for aggregating context information when receiving messages.

Illustrating now an example of functionality in a receiving scenario, attention is directed to FIG. 2, which illustrates an example method 200 that may be practiced in a computing environment. The method 200 includes acts for aggregating context information for messages. The method 200 includes receiving a message from a computer implemented communication medium (act 202). For example, with reference to FIG. 1, an application 100 may receive a message from a network 114 as illustrated at (1). The message may be received at a network protocol component 104, which may be a computer implemented module capable of communicating with the network 114.

The method 200 further includes processing the message to form a canonical enveloped message. The canonical enveloped message includes payload data and a context store. The payload data may include information received in the message from the network 114 and the context store may be the context store 102 illustrated in FIG. 1. FIG. 1 illustrates at (2a) that a raw message received from the network 114 may be processed by an encoder component 106 to create a canonical message and raw context that can be processed, as illustrated at (2b) by an extraction component 108 to create a canonical message with context. As illustrated at (3a), (3b), and (4) this canonical message with context is passed to a plurality of additional protocol components 110. Notably, embodiments may be implemented where a message received by the network protocol component is not necessarily a raw message devoid of context information. Nonetheless, as will be described in more detail later herein, a message with context may be rewritten so that the context is represented in a standardized format for a canonical message with context. For example, embodiments may be implemented where processing the message to form a canonical enveloped message includes transforming one SOAP message into another SOAP message.

Referring once again to FIG. 2, the method 200 further includes processing the canonical enveloped message including using two or more protocol components to process the canonical enveloped message (act 206). As illustrated in FIG. 1, this may be performed at a protocol pipeline 116 comprising a network protocol component 104 and a plurality of protocol components 110. Processing the canonical enveloped message using a protocol component may include, for each protocol component used, at least one of, adding, removing or modifying context entries in the context store 102. Each context entry in the context store includes at least a name element, a value element, and optionally a metadata element. Additionally, processing by the protocol components is performed such that context information for a plurality of protocol components is aggregated using a common format in the context store 102. The method 200 may be practiced where processing the canonical enveloped message using a protocol component includes for a given protocol component and for at least one of the context entries in the context store 102, adding or modifying a metadata element of the context entry such that the metadata element of the context entry includes information about the given protocol element that added or modified the context entry. For example, the protocol component may add information to the context store 102 about the protocol used by the protocol component.

Referring once again to FIG. 2, the method 200 further includes processing the canonical enveloped message at an application (act 208). This may include processing based on context entries in the context store 102, including context entries added or modified by the protocol components.

Additional details of some embodiments of the method 200 are now illustrated. The method 200 may be practiced where processing the canonical enveloped message using a protocol component includes, for a given protocol component, determining that a given context entry in the context store 102 is for use by a given protocol implemented by the given protocol component 110 and processing the canonical enveloped message using the given context entry. For example, a protocol component may examine the context store 102 to find a context entry that relates to a protocol used by the protocol component. The protocol component can then use context information or other metadata stored in the context store 102 to process the canonical enveloped message. Determining that a given context entry in the context store 102 is for use by the given protocol may include referencing a metadata element for the given context entry. The metadata element specifies that the given context entry is for use with the protocol implemented by the given protocol component.

As noted, the method 200 may be practiced on messages that are already enveloped when received at (1) as illustrated in FIG. 1 or by raw messages not included in an envelope. As such, the method 200 may be performed where processing the message to form a canonical enveloped message includes that a context store does not exist for the message and as a result, creating the context store. In some embodiments, wherein determining that a context store does not exist for the message and creating the context store may be performed by an additional protocol component 110 in the protocol pipeline 116.

In embodiments where the message received at (1) is already an enveloped message, the method 200 may include transforming the enveloped message to a canonical message in a different format. For example, the method 200 may be practiced where processing the message to form a canonical enveloped message comprises transforming one SOAP message into another SOAP message.

The method 200 may be practiced where the computer implemented communication medium, such a the network 114, includes HTTP. In some embodiments in this situation, the method 200 may further include receiving context information in at least one of a Set-Cookie header; Set-Cookie2; address-encoded context in query strings, hash fragments, or path components; authentication headers; hidden form fields; DOM properties; or local client stores. In some such embodiments, the method further includes storing the context information as one or more context entries in the context store 102.

Figure 3:
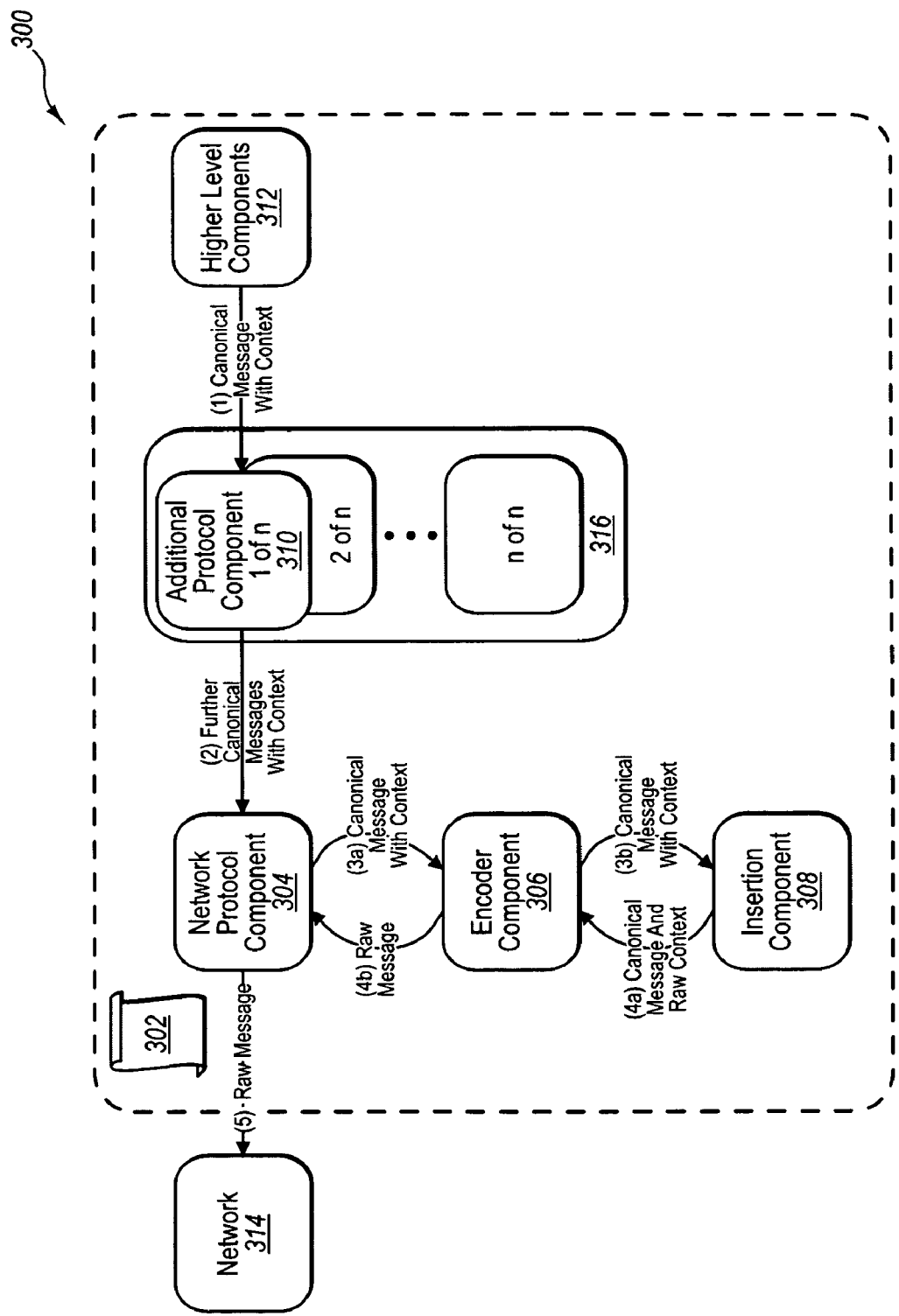
FIG. 3 illustrates system components and operations for sending messages.

Similar application components may be used when sending a message from an application. An example is illustrated at FIG. 3. In FIG. 3, elements with similar number to those in FIG. 1 may be implemented in a common module with those of FIG. 1. For example, the context container 302 illustrated in FIG. 3 may be the same as the context container 102 illustrated in FIG. 1. However, for example, while the insertion component 308 may be implemented in the same module as the extraction component 108, it may also be implemented as a separate component. The application 300 uses the following set of components when sending messages: a context container 302 that associates names with context values and metadata; network protocol component 304 that writes messages to a network transport; an encoder component 306 that translates messages from a canonical message format into a raw format; an insertion component 308 that retrieves context from the context container and inserts the context values and metadata into a native network transport protocol message; additional protocol components 310 that add, remove, or modify entries in the context container; and higher level application components 312 which effectively represent the rest of the system. The application 300 (and application 100) may be configured with additional components, such as in the message processing pipeline 316 (or 116), that do not change or act on the context. These additional components pass the message through without altering the context container.

Figure 4:
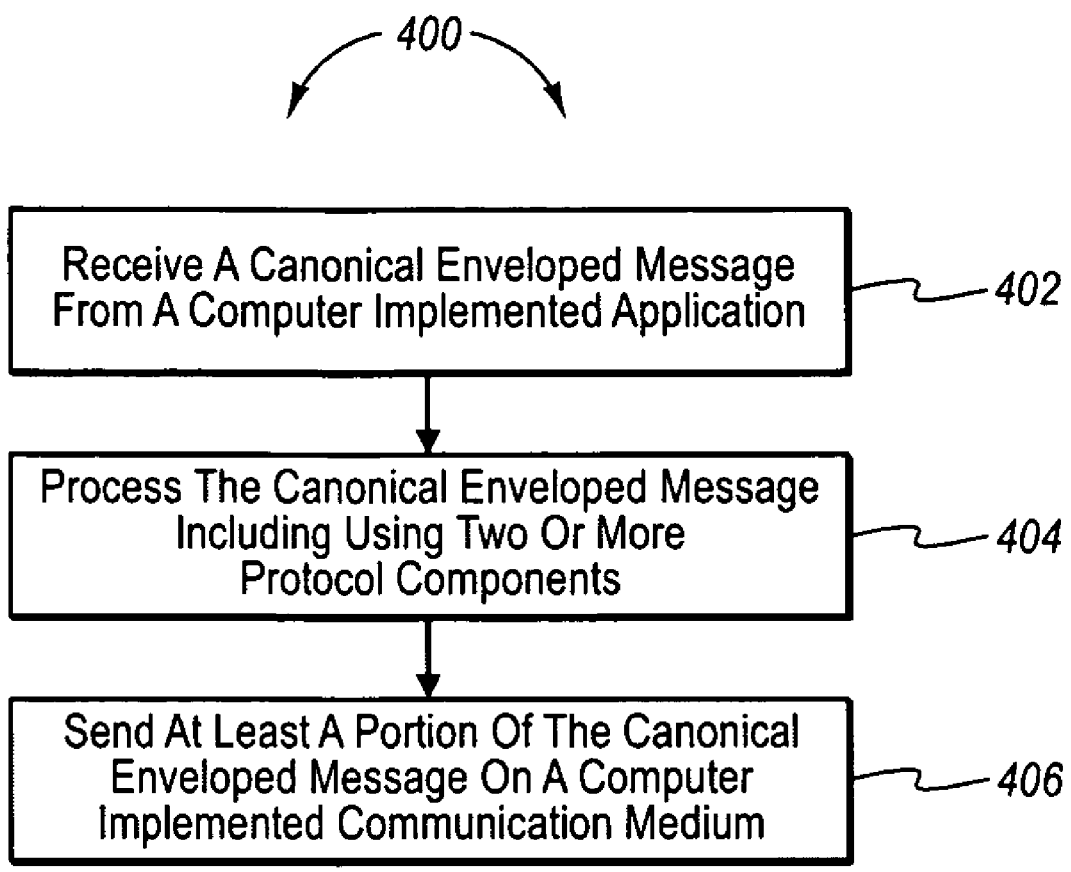
FIG. 4 illustrates a method for aggregating context information when sending messages.

Reference is now made to FIG. 4, which illustrates a method 400 illustrating acts for processing messages sent from the application 300 illustrated in FIG. 3. The method 400 includes receiving a canonical enveloped message from a computer implemented application (act 402). For example, a message may be received from the higher level components 312. The canonical enveloped message includes payload data and is associated with a context store 302.

The method 400 further includes processing the canonical enveloped message including using two or more of the protocol components to process the canonical enveloped message (act 404). This may be performed, for example, at a protocol pipeline 316 including a network protocol component and a plurality of additional protocol components 310. Processing the canonical enveloped message using a protocol component may include, for each protocol component used, at least one of, adding, removing or modifying context entries in the context store 302. Each context entry in the context store 302 may include a name element, a value element, and optionally a metadata element.

The method 400 further includes sending at least a portion of the canonical enveloped message on a computer implemented communication medium (act 406). For example, the message may be sent as illustrated at (5) in FIG. 3 on the network 314. Notably, while FIG. 3 illustrates that the message is sent as a raw message, the message may be sent as an enveloped message as well should circumstances so dictate. For example, if the message sent on the network 314 is a SOAP message, it will include a SOAP envelope.

Also, as illustrated in FIG. 3, the encoder component 306 and insertion component 308 can be used to create a raw message or other message that is transmitted by the network protocol component 304 onto the network 314. Thus, for example, the method 400 may further include, prior to sending at least a portion of the canonical enveloped message on a computer implemented communication medium, converting the canonical enveloped message to a raw message that does not include the context store 302. In this example, embodiments may be implemented where sending at least a portion of the canonical enveloped message on a computer implemented communication medium includes sending the raw message.

In some embodiments, at least one context entry in the context store 302 includes a context entry metadata element defining restrictions on the use of the context entry. For example, restrictions on the use the context entry may include restrictions based on protocols, resource addresses, security, or time. A protocol component may examine the entries in the context store while processing the message to test the restrictions defined by the context entry metadata. For example, when a restriction based on time is included, the restriction may define an expiration of the context entry. The protocol component may compare the expiration time with the current system time to test whether the context entry has expired. An expired context entry may be omitted when the message is transmitted or may be refreshed with a more current value.

As an example of using this invention when receiving a message, consider a SOAP-formatted message transmitted over HTTP using both the HTTP Set-Cookie protocol and custom SOAP headers that contain context information.

The Set-Cookie header that accompanies the message is:
Set-Cookie: username=User; orderid=123; path=/example The fragment of the SOAP message that contains the context information is:

```
<context:ApplicationContextProtocol s:mustUnderstand="true">
    <context:context name="language">
        <context:value>en-US</context:value>
        <context:metadata>
            <context:unsecured />
        </context:metadata>
    </context:context>
</context:ApplicationContextProtocol>
```

The implementation of the context container is a flat structure that associates a context name string with a context value string and metadata. The extraction component has been configured to flatten the entries in the Set-Cookie header into individual context container entries. The resulting context store has a context entry with a name of username, a value of User, and metadata restricting the context entry for use with addresses that have a path segment/example; a context entry with a name of ordered, a value of 123, and metadata restricting the context entry for use with addresses that have a path segment/example; and, a context entry with a name of language, a value of en-US, and metadata restricting the context entry for use with either secured or unsecured message delivery.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of aggregating context information for messages, the method comprising:

receiving a plurality of messages from a computer implemented communication medium, each message including context information conforming to one or more protocols employed by the message;

for each of the received messages:

processing the message to form a canonical enveloped message, the canonical enveloped message comprising payload data and a header, and wherein processing the message to form a canonical enveloped message further includes creating a context store as a property of the header of the canonical enveloped message for storing the context information of the message in a form that is independent of the one or more protocols employed by the message;

at a protocol pipeline comprising a plurality of protocol components processing the canonical enveloped message to extract the context information conforming to the one or more protocols employed by the message and include the extracted context information within the context store of the canonical enveloped message, wherein each portion of the context information is stored in the context store as a context entry that comprises at least a name element to identify the portion, a value element representing the value of the identified portion, and optionally a metadata element that defines any additional information about the identified portion, such that context information for a plurality of protocol components is aggregated using a common format in the context store; and processing the canonical enveloped message at an application, including accessing at least some of the context entries in the context store to retrieve the context information of the message.

2. The method of claim 1, further comprising:

for a given protocol component, determining that a given context entry in the context store is for use by a given protocol implemented by the given protocol component and processing the canonical enveloped message using the given context entry.

3. The method of claim 2, wherein determining that a given context entry in the context store is for use by the given protocol comprises referencing a metadata element for the given context entry, the metadata element specifying that the given context entry is for use with the protocol implemented by the given protocol component.

4. The method of claim 2, wherein processing the canonical enveloped message using the given context entry comprises adding or modifying a metadata element of the context entry such that the metadata element of the context entry comprises information about the given protocol component that added or modified the context entry.

5. The method of claim 1, wherein the received message is a non-enveloped message and the canonical enveloped message is a SOAP message.

6. The method of claim 1, wherein, for at least some of the plurality of messages, the computer implemented communication medium comprises HTTP, and the context information of the at least some of the plurality of messages is included in at least one of a Set-Cookie header; Set-Cookie2 header; address-encoded context in query strings, hash fragments, or path components; authentication headers; hidden form fields; Document Object Model (DOM) properties; or local client stores.

7. In a computing environment, one or more physical storage devices storing computer executable instructions which when executed perform a method of aggregating context information for messages, the method comprising:

receiving a plurality of messages from a computer implemented communication medium, each message including context information conforming to one or more protocols employed by the message;

for each of the received messages:

processing the message to form a canonical enveloped message, the canonical enveloped message comprising payload data and a header, and wherein processing the message to form a canonical enveloped message further includes creating a context store as a property of the header of the canonical enveloped message for storing the context information of the message in a form that is independent of the one or more protocols employed by the message;

at a protocol pipeline comprising a plurality of protocol components processing the canonical enveloped message to extract the context information conforming to the one or more protocols employed by the message and include the extracted context information within the context store of the canonical enveloped message, wherein each portion of the context information is stored in the context store as a context entry that comprises at least a name element to identify the portion, a value element representing the value of the identified portion, and optionally a metadata element that defines any additional information about the identified portion, such that context information for a plurality of protocol components is aggregated using a common format in the context store; and processing the canonical enveloped message at an application, including accessing at least some of the context entries in the context store to retrieve the context information of the message.

8. The one or more physical storage devices of claim 7, further comprising:

for a given protocol component, determining that a given context entry in the context store is for use by a given protocol implemented by the given protocol component and processing the canonical enveloped message using the given context entry.

9. The one or more physical storage devices of claim 8, wherein determining that a given context entry in the context store is for use by the given protocol comprises referencing a metadata element for the given context entry, the metadata element specifying that the given context entry is for use with the protocol implemented by the given protocol component.

10. The one or more physical storage devices of claim 8, wherein processing the canonical enveloped message using the given context entry comprises adding or modifying a metadata element of the context entry such that the metadata element of the context entry comprises information about the given protocol component that added or modified the context entry.

11. The one or more physical storage devices of claim 7, wherein the received message is a non-enveloped message and the canonical enveloped message is a SOAP message.

12. The one or more physical storage devices of claim 7, wherein, for at least some of the plurality of messages, the computer implemented communication medium comprises HTTP, and the context information of the at least some of the plurality of messages is included in at least one of a Set-Cookie header; Set-Cookie2 header; address-encoded context in query strings, hash fragments, or path components; authentication headers; hidden form fields; Document Object Model (DOM) properties; or local client stores.

13. A computer system comprising a processor and memory storing computer executable instructions which when executed by the processor perform a method of aggregating context information for messages, the method comprising:

receiving a plurality of messages from a computer implemented communication medium, each message including context information conforming to one or more protocols employed by the message;

for each of the received messages:

processing the message to form a canonical enveloped message, the canonical enveloped message comprising payload data and a header, and wherein processing the message to form a canonical enveloped message further includes creating a context store as a property of the header of the canonical enveloped message for storing the context information of the message in a form that is independent of the one or more protocols employed by the message;

at a protocol pipeline comprising a plurality of protocol components processing the canonical enveloped message to extract the context information conforming to the one or more protocols employed by the message and include the extracted context information within the context store of the canonical enveloped message, wherein each portion of the context information is stored in the context store as a context entry that comprises at least a name element to identify the portion, a value element representing the value of the identified portion, and optionally a metadata element that defines any additional information about the identified portion, such that context information for a plurality of protocol components is aggregated using a common format in the context store; and processing the canonical enveloped message at an application, including accessing at least some of the context entries in the context store to retrieve the context information of the message.

14. The system of claim 13, further comprising:

for a given protocol component, determining that a given context entry in the context store is for use by a given protocol implemented by the given protocol component and processing the canonical enveloped message using the given context entry.

15. The system of claim 14, wherein determining that a given context entry in the context store is for use by the given protocol comprises referencing a metadata element for the given context entry, the metadata element specifying that the given context entry is for use with the protocol implemented by the given protocol component.

16. The system of claim 14, wherein processing the canonical enveloped message using the given context entry comprises adding or modifying a metadata element of the context entry such that the metadata element of the context entry comprises information about the given protocol component that added or modified the context entry.

17. The system of claim 13, wherein the received message is a non-enveloped message and the canonical enveloped message is a SOAP message.

18. The system of claim 13, wherein, for at least some of the plurality of messages, the computer implemented communication medium comprises HTTP, and the context information of the at least some of the plurality of messages is included in at least one of a Set-Cookie header; Set-Cookie2 header; address-encoded context in query strings, hash fragments, or path components; authentication headers; hidden form fields; Document Object Model (DOM) properties; or local client stores.

* * * * *